United States Patent
Ramabadran et al.

(10) Patent No.: US 10,868,748 B1
(45) Date of Patent: Dec. 15, 2020

(54) TESTING FORWARDING STATES ON MULTIPLE PIPELINES OF A NETWORK DEVICE

(71) Applicant: Amazon Technologies, Inc., Seattle, WA (US)

(72) Inventors: Srinivasan Ramabadran, Sunnyvale, CA (US); Hardeep Singh, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/144,708

(22) Filed: Sep. 27, 2018

(51) Int. Cl.
*H04L 12/26* (2006.01)
*H04L 29/06* (2006.01)
*H04L 29/12* (2006.01)

(52) U.S. Cl.
CPC .............. *H04L 43/12* (2013.01); *H04L 43/50* (2013.01); *H04L 61/6022* (2013.01); *H04L 63/101* (2013.01); *H04L 69/164* (2013.01); *H04L 69/22* (2013.01)

(58) Field of Classification Search
CPC ..... H04L 43/12; H04L 43/50; H04L 61/6022; H04L 63/101; H04L 69/164; H04L 69/22
See application file for complete search history.

(56) References Cited

U.S. PATENT DOCUMENTS

| | | | |
|---|---|---|---|
| 7,457,277 B1 | 11/2008 | Sharma et al. | |
| 7,817,571 B2 * | 10/2010 | Claise | H04L 63/101 370/252 |
| 8,427,970 B2 | 4/2013 | Benkis | |
| 8,472,315 B2 | 6/2013 | Sommerville et al. | |
| 8,670,326 B1 | 3/2014 | Balasubramanian et al. | |
| 9,083,347 B1 * | 7/2015 | Remla | H03K 21/38 |
| 9,491,083 B2 | 11/2016 | Brolin et al. | |
| 9,547,570 B2 | 1/2017 | Chu et al. | |
| 9,577,911 B1 | 2/2017 | Castleman | |
| 9,596,164 B1 | 3/2017 | Kumar et al. | |
| 9,699,030 B1 * | 7/2017 | Kumar | H04L 41/0853 |
| 9,954,751 B2 * | 4/2018 | Zhang | H04L 43/0823 |
| 10,038,597 B2 | 7/2018 | Casado et al. | |
| 10,044,646 B1 * | 8/2018 | Detwiler | H04L 49/354 |
| 10,200,279 B1 | 2/2019 | Aljaedi | |

(Continued)

OTHER PUBLICATIONS

U.S. Appl. No. 16/020,844, filed Jun. 27, 2018, Ramabadran et al.

(Continued)

*Primary Examiner* — Chi H Pham
*Assistant Examiner* — Ji-Hae Yea
(74) *Attorney, Agent, or Firm* — Klarquist Sparkman, LLP

(57) ABSTRACT

A source network device can inject a probe into any one of multiple pipelines by supplying control bits for controlling a demultiplexer through which the probe passes. The control bits of the probe are coupled to the demultiplexer select lines so as to couple an input port of the demultiplexer to one of multiple output ports. As a result, an agent operating on the source network device can test any desired pipeline. In a one-hop embodiment, the source network device redirects the probe back to the agent without transmission to a neighbor. A two-hop embodiment uses a neighbor device to reflect the probe back to the source device in order to test forwarding states of the source network device.

19 Claims, 15 Drawing Sheets

(56) References Cited

U.S. PATENT DOCUMENTS

| | | |
|---|---|---|
| 10,439,880 B2 | 10/2019 | Bryant et al. |
| 10,462,037 B1 | 10/2019 | Ramabadran |
| 2003/0185210 A1* | 10/2003 | McCormack ........... H04L 43/50 370/392 |
| 2008/0117829 A1 | 5/2008 | Nakano et al. |
| 2009/0316588 A1 | 12/2009 | Nakamura |
| 2010/0014518 A1 | 1/2010 | Duncan et al. |
| 2014/0092751 A1 | 4/2014 | Meilik et al. |
| 2014/0119203 A1 | 5/2014 | Sundaram et al. |
| 2014/0119379 A1 | 5/2014 | Liang et al. |
| 2015/0188798 A1* | 7/2015 | Mizrahi ............. H04L 43/0829 370/252 |
| 2015/0222533 A1* | 8/2015 | Birrittella ............... H04L 45/66 370/392 |
| 2016/0094439 A1 | 3/2016 | Ravindran et al. |
| 2016/0127192 A1 | 5/2016 | Bryant et al. |
| 2016/0254985 A1 | 9/2016 | Judge et al. |
| 2017/0222881 A1* | 8/2017 | Holbrook ............ H04L 43/0876 |
| 2017/0346765 A1* | 11/2017 | Immidi ................. H04L 49/354 |
| 2018/0091405 A1* | 3/2018 | Koktan ............... H04L 45/7457 |
| 2018/0167294 A1 | 6/2018 | Gupta et al. |
| 2018/0212876 A1* | 7/2018 | Bacthu ................. H04L 45/748 |
| 2019/0052552 A1 | 2/2019 | Holbrook et al. |
| 2019/0052556 A1 | 2/2019 | Duda et al. |
| 2019/0182166 A1 | 6/2019 | Ghazisaeedi et al. |
| 2019/0273681 A1 | 9/2019 | Williams et al. |

OTHER PUBLICATIONS

Zeng et al., "Automatic Test Packet Generation," Proceedings of the 8th International Conference on Emerging Networking Experiments and Technologies, Dec. 2012, 12 pages.

* cited by examiner

TESTING FORWARDING STATES ON MULTIPLE PIPELINES OF A NETWORK DEVICE

BACKGROUND

Network switches play a critical role in large computer networks, such as those found in a data center. Server computers in the network can be divided into racks, and network switches can connect the server computers within a rack to routers in the data center. Data passed by switches is generally divided into a series of packets that can be transmitted between devices. Packets include control information and payload data. The control information includes information used to deliver the payload data. For example, control information can include source and destination network addresses, error detection codes, packet sequencing identification, and the like. Typically, control information is found in packet headers and trailers included within the packet and adjacent to the payload data.

Generally, network switches have two primary planes: a control plane and a data plane. The control plane is a management plane that configures the data plane. The data plane receives packets on input ports and transmits the received packets to output ports based on the configuration. A forwarding table within the data plane controls which next hops receive the packets. Typically, the forwarding table is programmed in accordance with routing strategies, such as equal-cost multi-path (ECMP) routing, which is a strategy where next-hop packet forwarding to a destination can occur over multiple best paths. ECMP is per-hop decision limited to a single router, and can be inefficient if routers in the network are not functioning.

Testing of network switches can be problematic. Typically, test probes are sent from a source host device through a network of switches to a destination host device. The probes are effective at testing the paths and links in the network, but not effective at testing forwarding states of the network devices themselves.

DETAILED DESCRIPTION

A deterministic model that is used for testing networks by exercising forwarding states (e.g., layer 2 and layer 3) on network devices is described. Incorrect forwarding states, if left undetected, can result in packet loss. The system can generate a signal that eliminates manual troubleshooting efforts for each occurrence of grey failures by transmitting probes used to test the forwarding states of the devices. A source network device can inject a probe into any one of multiple pipelines in the switching logic (e.g., a switch ASIC) of the network device by supplying control bits for controlling a demultiplexer through which the probe passes. The control bits of the probe are coupled to the demultiplexer select lines so as to couple an input port of the demultiplexer to one of multiple output ports. As a result, an agent operating on the source network device can test any desired pipeline. A two-hop embodiment uses a neighbor device to reflect the probe back to the source device in order to test the forwarding states. With two neighbor hops (e.g., a source network device A and a peer network device B), a light-weight agent resides on one or both of the hops and can be used to control the testing. Probe allocation can be managed locally on the source network device based on a layer 3 routing table and ECMP links. One or more probes originating from the source network device from a local CPU are routed on the same network device A in hardware and sent out on an ECMP member link towards the peer network device. The peer device B captures the probe and reflects the probe back to network device A on the ingress port. Network device A can then capture the reflected probe to verify the actual forwarding behavior applied on the probe packet. In a one-hop embodiment, the source network device intercepts the probe before it is transmitted to a neighbor. More specifically, a source network device can inject a probe and recapture it in an output pipeline after exercising the forwarding states, such that the probe is not transmitted to a neighbor device.

Figure 1:
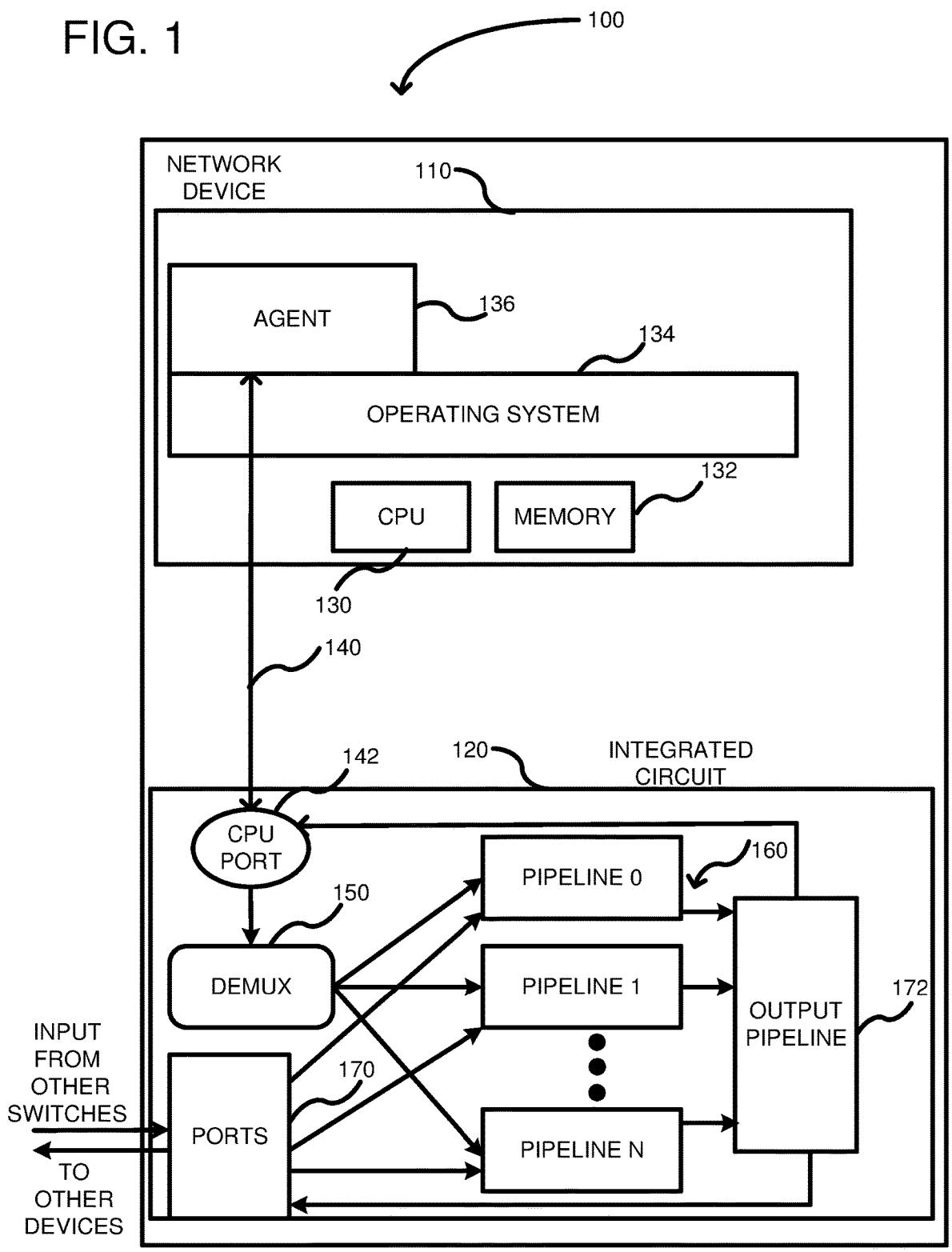
FIG. 1 is a diagram illustrating a network device that uses a demultiplexer to inject a probe network packet into any of a plurality of pipelines in an integrated circuit (IC) within the network device.

FIG. 1 shows an example network device 100. The network device 100 can be any switch for forwarding packet data including, but not limited to, a router, a switch, a load balancer, a firewall, etc. The network device has a management portion 110 used for controlling an integrated circuit (IC) 120, which is a switching portion of the network device. The management portion includes a CPU 130 coupled to a memory 132. Although a central processing unit (CPU) is shown, any desired controller can be used including a processor in an application-specific IC (ASIC) or any other type of processor. The memory 132 can be a variety of memories, but typically a Random Access Memory (RAM) is used (e.g., a Dynamic RAM or DRAM). The CPU 130 can execute an operating system 134, which, in turn, can run one or more applications, such as an agent 136. The agent 136 can be an executable process that controls testing of the network device 100. The management portion 110 can be coupled to the IC 120 through a bus 140 (PCIe or other protocols and bus types can be used) allowing the agent 136 to communicate with the IC through a CPU port 142, used for injecting probe network packets into the IC 120. The CPU port 142 is coupled to a demultiplexer 150. The demultiplexer (or demux) is a device that receives a single input signal and transmits the input signal on one of many candidate data-output-lines, based on a selection (i.e., control) input. The output ports of the demultiplexer 150 are coupled to a plurality of packet pipelines, shown generally at 160, on a one-to-one basis. As described further below, a portion of the CPU port 142 is coupled to the select lines of the demultiplexer, while another portion (or the whole CPU port) is coupled to input lines of the demultiplexer 150. Thus, a network probe transmitted by the agent 136 to the CPU port 142 can pass through the demultiplexer and can also select which of many pipelines 160 it is transmitted to. In other words, the probe network packet includes data plus demux routing information. The number of pipelines 160 can be any number from 0-N (where N is any integer value). The network device 100 can also receive network packets from external network devices on ports 170 and transmit the packets to other devices from an output pipeline 172 coupled to the ports 170. The ports 170 have a one-to-one correspondence with the packet pipelines 160. Such externally received network packets are non-test network packets, which can include customer-generated network traffic. Intermingled with such network traffic is the probe network packets injected by the agent 136.

Figure 2:
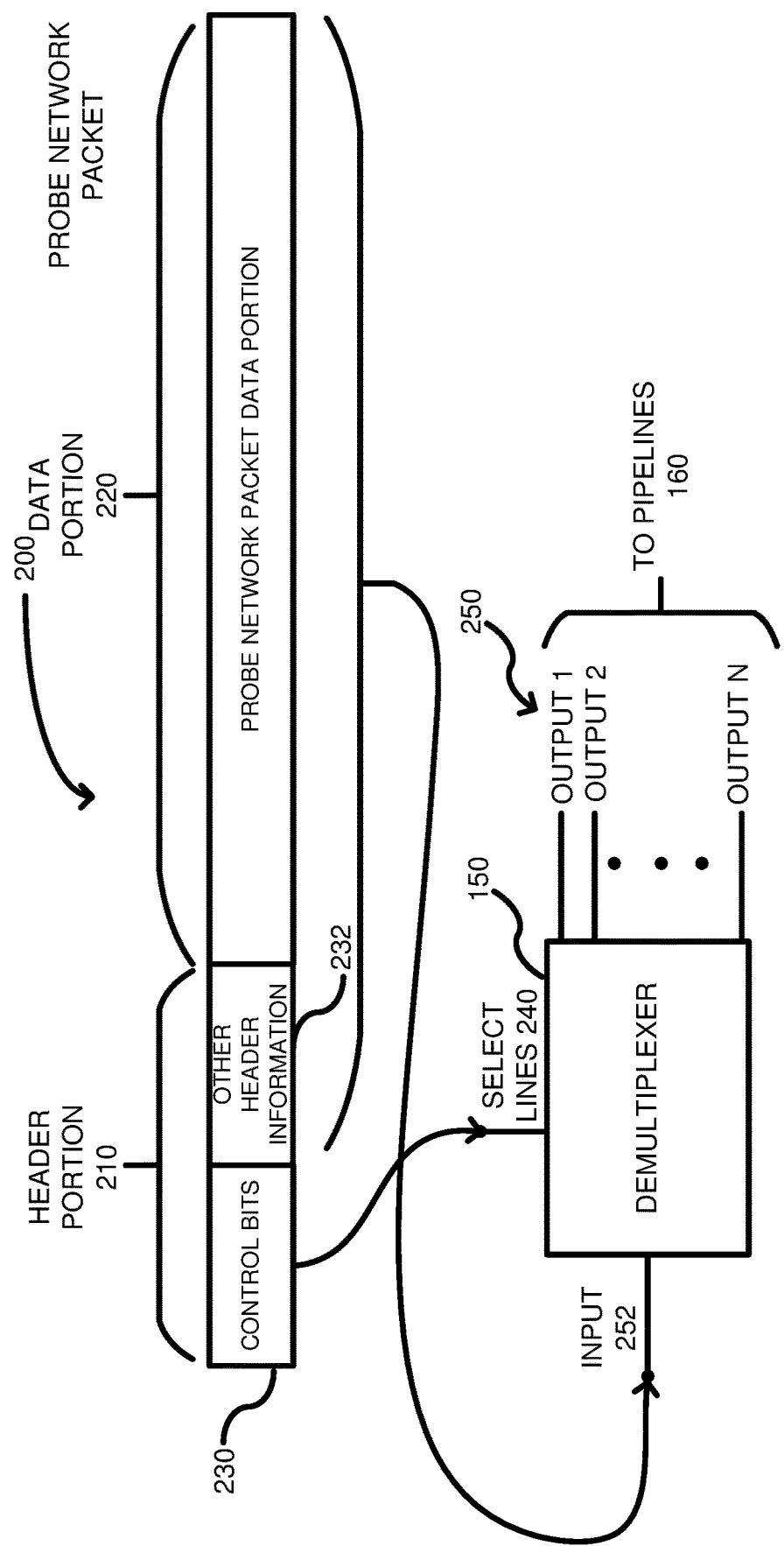
FIG. 2 is an example probe network packet including control bits that can be provided to demultiplexer selection lines.

FIG. 2 is an example network packet 200 that includes a header portion 210 and a data portion 220 (also called a packet payload). The header portion 210 can include multiple fields including control bits 230 and other header information 232 normally included in a packet, such as address information, etc. The control bits 230 can be provided to the demultiplexer 150, and particularly, to select lines 240 of the demultiplexer. The select lines 240 control which output port 250 is coupled to an input port 252. The input port 252 is coupled to receive at least the header bits 232 and the data portion 220 of the network packet 200, but in some cases can also receive the control bits 230 so that the control bits 230 serve a dual purpose of being data and control information. In such a case, the control bits 230 can be used to extend the data portion 220 should extra data bits be needed. The agent, such as the agent 136 of FIG. 1, can select the control bits such that each pipeline is tested with the same data. Thus, the control bits can be logically incremented (e.g., 1, 2, 3, etc.) to select the pipelines in order, for example. The demultiplexer 150 can pass the probe network packet 200 through the demultiplexer logic to one of the output pipelines 160 based on the select lines 240. Thus, the select lines 240 couple one of the output lines (1-N) 250 to the input port 252. Once the network packet passes to the pipelines, it can be re-routed back to the agent 136 for analysis using a variety of techniques outlined below. Based on the received network packet by the agent, a determination can be made whether a lookup performed in the pipeline is accurate.

Figure 3:
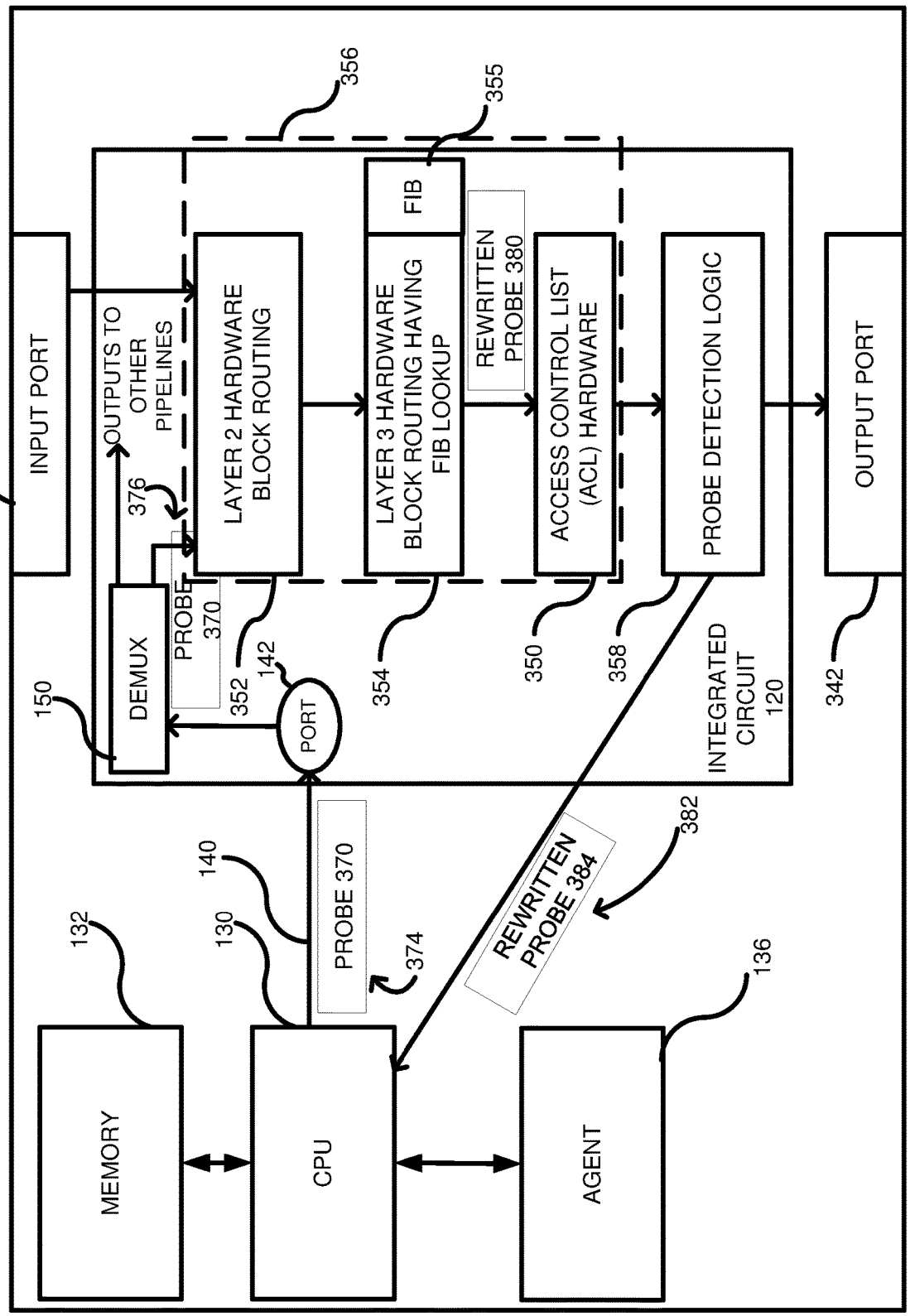
FIG. 3 is a detailed diagram of an embodiment showing a network device injecting a probe into switching logic and redirecting the probe back to the agent without transmission of the probe to a neighbor device.

FIG. 3 shows a detailed example of an embodiment of the network device 100. Network device 100 is a switch that routes packets to a next hop in the network using a destination Internet Protocol (IP) address. The CPU 130 is coupled to the memory 132 and to the IC 120, (also referred to as "switching logic"), through the bus 140 (PCIe or other protocols and bus types can be used). The switching logic 120 is positioned between an input port 340 and an output port 342, which are typically adapted to receive network cables, such as Ethernet cables. Although the input port 340 and output port 342 are shown as a single port, it should be understood that there are actually many ports that the network packets can be routed to. The switching logic 120 can be a single ASIC integrated circuit or divided into multiple ICs. The switching logic 120 can include multiple different hardware logic blocks including a Layer 2 hardware block 352, a Layer 3 hardware block 354, and an Access Control List (ACL) hardware block 350. The layer 2 hardware block 352 relates to an Ethernet layer and can forward packets based on Media Access Control (MAC) tables (not shown). The layer 3 hardware block 354 relates to forwarding based on a longest prefix match of an IP address. Layer 3 typically involves a route lookup, decrementing a Time-To-Live (TTL) count, calculating a checksum, and forwarding the frame with the appropriate MAC header to the correct output port. The route lookup of the layer 3 hardware can include searching within a Forwarding Information Base (FIB) 355, which includes destination addresses for packets being transmitted through the switching logic 120 and rewriting the packets in accordance with the lookup. Rewriting can occur in a rewrite engine, which can be external to the layer 3 hardware or included internally therein. The network device 100 can run routing protocols, such as an Open Shortest Path First (OSPF) or a Routing Information Protocol (RIP), to communicate with other Layer 3 switches or routers. The routing tables are used to lookup the route for an incoming packet. The ACL block 350 relates to permissions and can include rules whether to drop packets. More specifically, the ACL block can provide rules that are applied to different ports. Additionally, the ACL block can have rules that are applied to designated IP addresses. The ACL block can control outbound packets and, in this sense, it is similar to a firewall. The layer 2 hardware 352, the layer 3 hardware 354 and the ACL 350 together form an ingress pipeline 356. The demultiplexer 150 is coupled to the CPU port 142 so that packets can be injected from the CPU 130 into the ingress pipeline 356. A probe detection logic 358 can be included in ingress pipeline 356 at a desired position for testing at least the layer 2 hardware 352 and layer 3 hardware 354. In the illustrated embodiment, the probe detection logic 358 is positioned after the ACL hardware 350. In alternative embodiments, the probe detection logic 358 can also be included in the ACL hardware 350. The probe detection logic 358 is hardware logic used to differentiate test probes from regular traffic. Specifically, test probes are diverted back to the CPU 130, while other network packets (e.g., customer traffic) are routed to the output port 342. In the case where the probes are diverted back to the CPU, the lookup performed on the FIB is ignored. The different hardware blocks can be coupled in series and additional hardware blocks can be added based on the design. Typical network packets pass from the input port 340 to the output port 342 in accordance with the configuration of the hardware logic blocks 350, 352, 354, and 358.

As shown, the agent 136 can execute on the CPU 130 and can be used to control testing of the network device 100 using a probe 370. The agent 136 passes the probe to the CPU hardware 130 for transmitting the probe to the switching logic 120 via the bus 140 (as shown at 374). The probe 370 enters the switching logic 120 at port 142, which then feeds the probe to the demultiplexer 150. Based on the demultiplexer select lines, the probe is then injected into an ingress pipeline of the switching logic as shown at 376, such that it passes through Layer 2 hardware 352, Layer 3 hardware 354 and the ACL hardware 350. The probe 370 includes an appropriate MAC address that matches a MAC address of the network device 100 so that L3 switching occurs. Specifically, the probe includes a layer 2 header wherein the destination MAC address equals a MAC address of network device 100. The layer 2 hardware 352 performs a lookup on the probe and determines that the probe's MAC address matches the network device's MAC address. The probe packet 370 also includes a destination address that is an IP address (faux or real) within the Layer 3 lookup tables (the FIB 355). More particularly, the layer 3 hardware 354 performs a lookup on a prefix of the probe 370 and determines a proper output port 342 that directs the probe packet 370 towards a peer network device. Alternatively, the probe 370 can have the full IP destination address (which includes the prefix) for lookup in the layer 3 hardware 354. In either case, the agent 136 ensures that the probe 370 includes a destination address that is found in the FIB so as to test the forwarding states of the switching logic 120. The probe is rewritten, as shown at 380, to include a proper MAC address for whatever peer network device was determined in the layer 3 lookup. Additionally, the rewritten probe 380 includes an identifier of what output port 342 was determined in the layer 3 lookup. After the rewritten probe 380 passes through the ACL hardware 350, it is detected as a test probe by probe detection logic 358. Rather than transmit the rewritten probe 380 to the output port 342 determined by the layer 3 lookup, the probe detection logic 358 diverts the rewritten probe to the CPU 130, as shown at 382. In some embodiments, the probe detection logic can change a header on the rewritten probe 380 from one of the output ports 342 to a CPU output port so that the rewritten probe 380 is routed to the CPU 130. Thus, the rewritten probe 380 is rewritten again as probe 384 so that it is passed to the CPU 130.

The input port 340, output port 342 and switching logic 120 can be considered a data plane of the network device 100. By contrast, the CPU 130, memory 132, and agent 136 are considered part of a control plane. Thus, the network device 100 is able to perform a self-test wherein a probe is injected from the control plane, into the data plane and diverted back to the control plane after the switching logic 120 performs packet switching operations. The control plane can then check whether the switching logic 120 is performing correctly. FIG. 3 is a single-hop approach wherein neighbor devices are not needed to test network packets.

Figure 4:
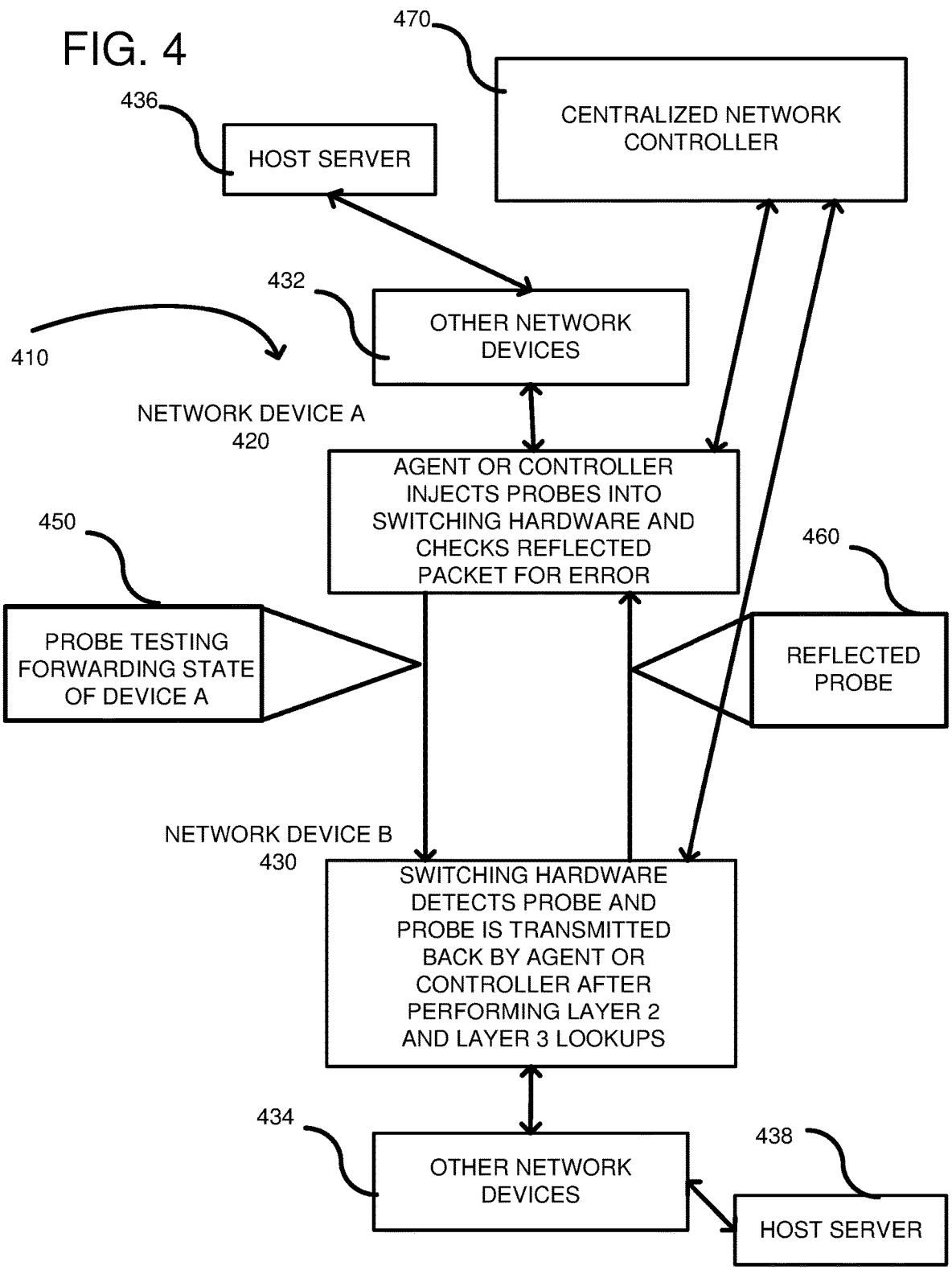
FIG. 4 is a diagram illustrating another embodiment with a network of switches including two neighbor switches, network device A and network device B, exchanging a probe to test forwarding states.

FIG. 4 shows an alternative two-hop approach of a network 410 wherein network devices A 420 and B 430 are neighbor devices that cooperatively test at least one forwarding table (such as in network device A) using multiple probes transmitted from network device A 420 to network device B 430 and reflected back to the network device A. In some embodiments, the network device 430 can be a host server computer, rather than a network device. The network devices 420 and 430 can be directly coupled together without intervening devices there between. In other embodiments, the network devices 420, 430 can have an intermediate layer 2 node there between. The network devices 420, 430 are part of a larger network of devices shown at 432, 434 that interconnect host server computers 436, 438 together so as to route traffic between the host server computers. As shown, network device A 420 has an agent or controller positioned thereon that injects a probe network packet 450 into switching hardware on a data plane (described further below). The probe network packet progresses through layer 2 and layer 3 lookups on the network device A so as to test the forwarding states. If the lookups are correct, the probe network packet 450 is transmitted from network device A to network device B and uses a real or faux network forwarding address just as though it is a real packet. Thus, the network device B 430 is not the destination address for the probe network packet 450. Rather, the destination address is another IP address in the network. Network device B 430 then receives the probe 450 on a port (not shown) and treats the probe 450 as any other packet in that the packet progresses through layer 2 and layer 3 routing hardware. As a result of the layer 3 lookup, a Media Access Control (MAC) header on the packet is modified or otherwise added to the packet. At an intermediate point after the layer 3 hardware and before the modified probe network packet is transmitted to an output port towards the network forwarding address, the network device B 430 compares a portion of the modified probe network packet (such as a UDP header) to a predetermined pattern and, if there is a match, network device B re-routs the modified probe network packet back to network device A 420. Thus, as shown at 460, the modified probe network packet is reflected back to network device A. The modified probe network packet can be further modified in a probe network response so that the source identifier is the network device B. The probe network response can be unmodified in other embodiments so as to be the probe network packet in a pure reflection.

Network device A 420 can then check the reflected probe 460 and detect that it is a probe (by matching the UDP header, for example) and transmit the probe to an agent or controller that can check that the forwarding information is correct on network device A 420. For example, network device A can check that it received the reflected probe 460 from the correct network device, which confirms that the layer 2 lookup on network device A was performed correctly and the layer 3 lookup transmitted the probe to the correct port. Thus, the forwarding states of network device A 420 can be confirmed by sending multiple probes between neighbor devices to test all of the forwarding states. Although only two network devices 420, 430 are shown exchanging packets, the other network devices 432, 434 can perform similar tests on respective neighbor devices. In this way, forwarding rules on the network devices are tested rather than testing merely links, which can happen when probes are sent from host 436 to host 438. A centralized controller 470 can execute on a server computer and communicate with the network devices, such as network device A and network device B, so as to receive reports of errors in the forwarding rules of those devices. For example, network device A can transmit a FIB error to the centralized controller 470 if there was a lookup error. Other error messages can also occur, such as if network device A received no return message at all after injecting the probe into its ingress pipeline.

Figure 5:
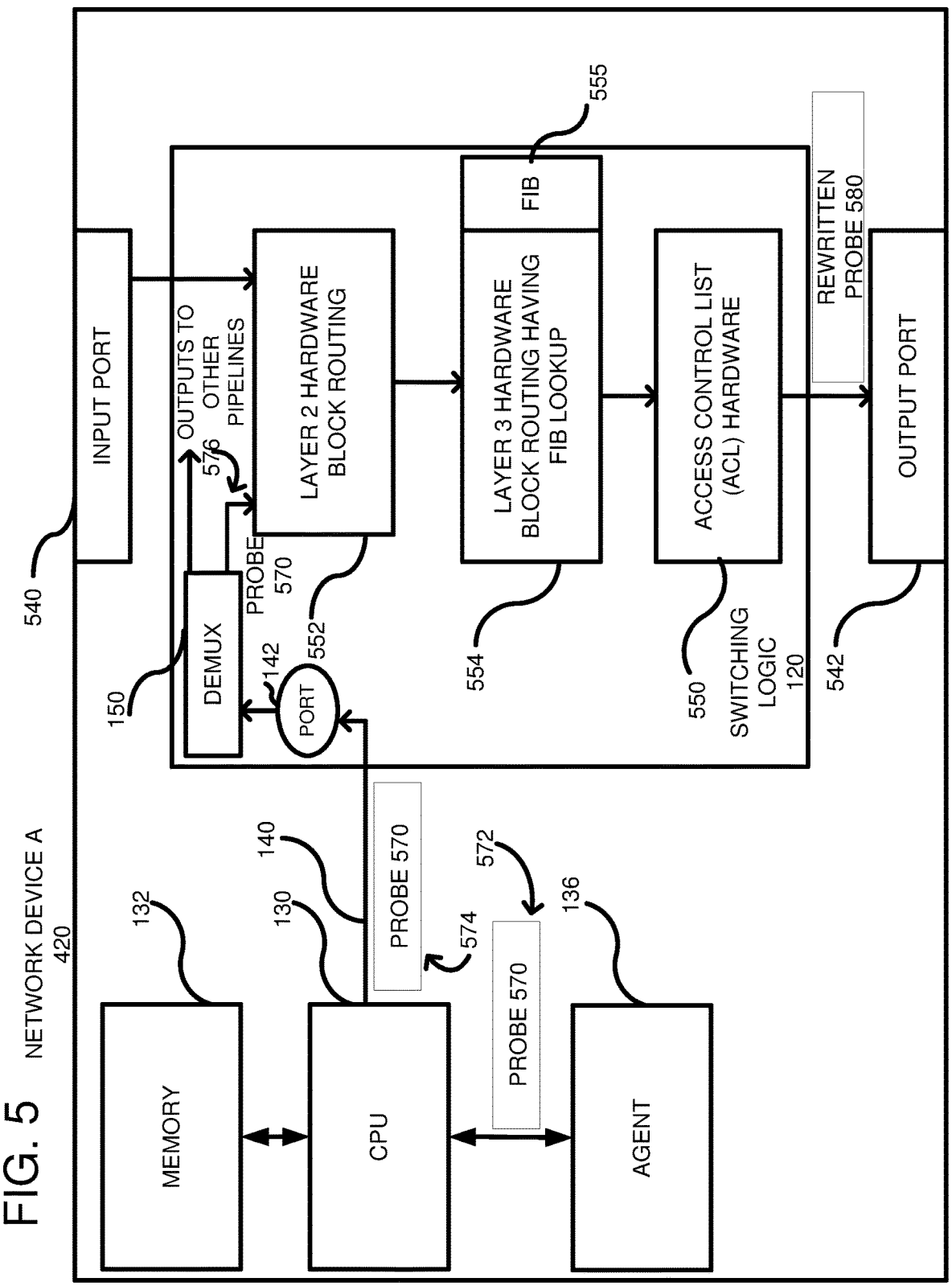
FIG. 5 is a detailed diagram of still another embodiment showing the network device A injecting a probe into switching logic using an agent for transmitting the probe to the network device B.

FIG. 5 shows a detailed example of an embodiment of the network device 420. In this embodiment, network device A 420 is a switch that routes packets to a next hop in the network using a destination IP address. The CPU 130 is coupled to the memory 132 and to switching logic 120 through a bus 140. The switching logic 120 is positioned between an input port 540 and an output port 542, which are typically adapted to receive network cables, such as Ethernet cables. The switching logic 120 can include multiple different hardware logic blocks including a Layer 2 hardware block 552, a Layer 3 hardware block 554, and an Access Control List (ACL) hardware block 550. The route lookup of the layer 3 hardware can include searching within a FIB 555, which includes destination addresses for packets being transmitted through the switching logic. The network device A 420 can run routing protocols, such as an Open Shortest Path First (OSPF) or a Routing Information Protocol (RIP), to communicate with other Layer 3 switches or routers. The routing tables are used to lookup the route for an incoming packet. The ACL block 550 relates to permissions and can include rules whether to drop packets. The different hardware blocks can be coupled in series and additional hardware blocks can be added based on the design. Packets pass from the input port 540 to the output port in accordance with the configuration of the hardware logic blocks 550, 552, 554. Although only a single input and output port are shown, usually there are multiple ports on the switch.

As shown, the agent 136 can execute on the CPU 130 and can be used to control testing of one or more network devices using a probe 570. As shown at 572, the agent 136 passes the probe to the CPU hardware 130 for transmitting the probe to the switching logic 120 via the bus 140 (as shown at 574). The probe 570 passes through the CPU port 142 to the demultiplexer 150, wherein the select lines of the demultiplexer are provided by the probe 570 to switch the demultiplexer 150 to the desired input pipeline. The probe is then injected into an input pipeline of the switching logic as shown at 576, such that it passes through Layer 2 hardware 552, Layer 3 hardware 554 and the ACL hardware 550. The probe 570 includes an appropriate MAC address that matches a MAC address of the network device A 420 so that L3 switching occurs. Specifically, the probe includes a layer 2 header wherein the destination MAC address equals a MAC address of network device A 420. The layer 2 hardware 552 performs a lookup on the probe and modifies the layer 2 header so that the destination MAC equals a MAC address of network device B 430 using layer 2 MAC tables (not shown). The probe packet 570 also includes a destination address that is an IP address (faux or real) within the Layer 3 lookup tables (the FIB 555). More particularly, the layer 3 hardware 554 performs a lookup on a prefix of the probe 570 and determines a proper output port 542 that directs the probe packet 570 towards network device B 430. Alternatively, the probe 570 can have the full IP destination address (which includes the prefix) for lookup in the layer 3 hardware 554. In either case, the agent 136 ensures that the probe 570 includes a destination address that is found in the FIB so as to test the forwarding states of the switching logic 120. The probe is rewritten, as shown at 580, to include a proper MAC address for the network device B 430 and sent to an output port 542 indicated by the layer 3 hardware 554.

Figure 6:
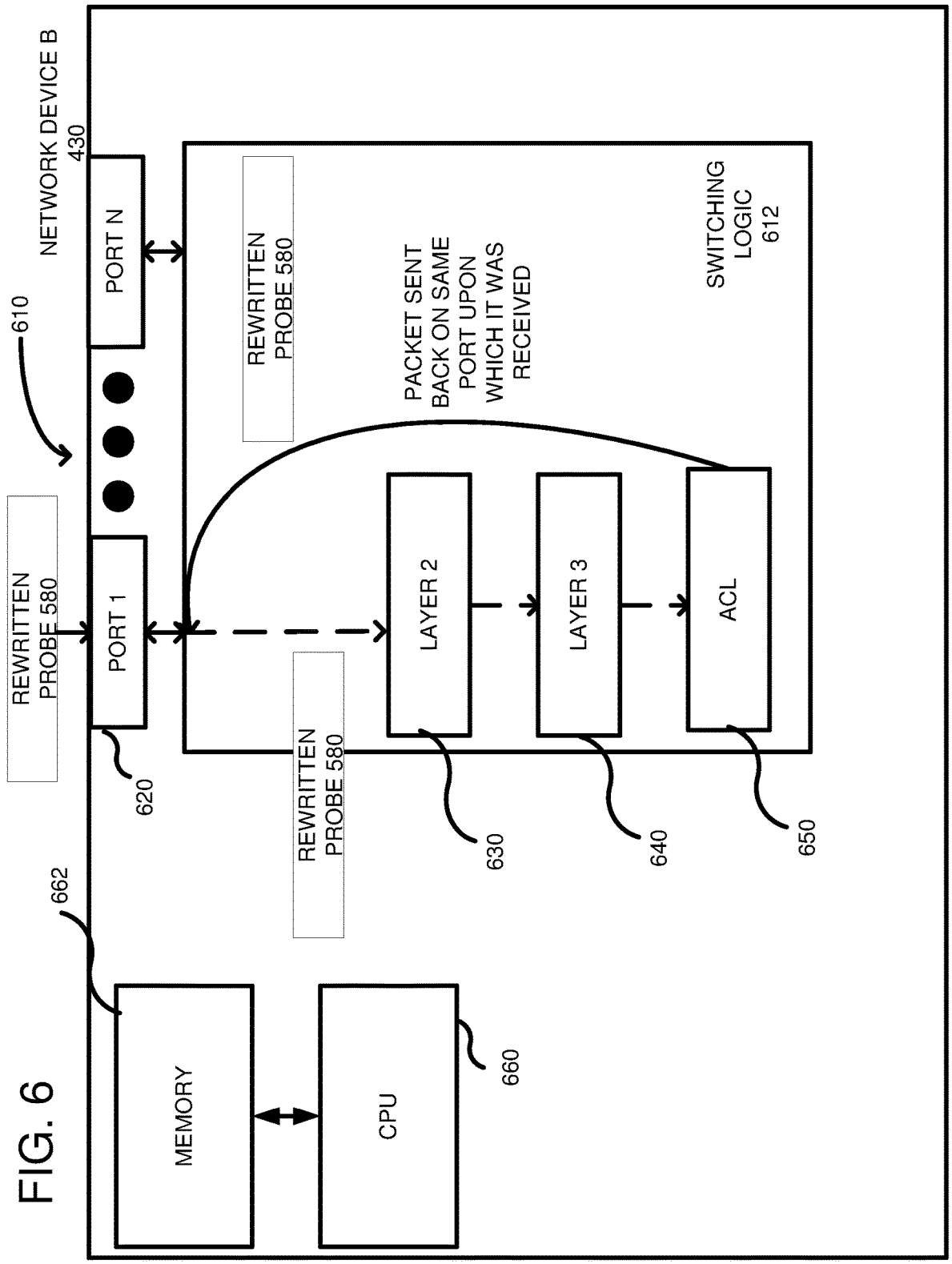
FIG. 6 shows the probe of FIG. 5 being received by the neighbor network device B and transmitted back to network device A on the same port upon which the probe was received.

FIG. 6 provides further details of network device B 430. As shown, the network device B 430 includes multiple ports (1 through N, wherein N is any integer value), shown generally at 610, used for inputting and transmitting packets from the network switch. Additionally, the network device B 430 includes switching logic 612 coupled to the ports. The rewritten probe 580 from network device A 420 is shown being transmitted to network device B 430 and arrives on Port 1 620 (which port it is received upon depends on the cabling between hops). The rewritten probe 580 passes through layer 2 hardware 630, layer 3 hardware 640 and the ACL 650, which detects that the rewritten probe 580 is a test probe using an ACL rule that matches a probe signature. The probe signature can differ based on the implementation, but can include an input port number, a UDP header and/or an IP address. If the ACL 650 matches the probe signature, then it transmits the rewritten probe 580 back on the same port 620 upon which it was received. Thus, whatever port that the layer 3 lookup determined is ignored and the ACL overrides the layer 3 lookup in favor of routing the probe 580 back to the same ingress port so that the receiving and transmitting ports are matched. By overriding the layer 3 lookup, the ACL can disregard any determination of a port upon which to transmit the probe and can cancel any rewriting of the probe that occurred to revert back to the probe 580 that was received on the input port. One advantage of this solution is that an agent need not be involved or executing on a CPU 660 and no additional storage is needed in memory 662. Additionally, the probe 580 is guaranteed to be able to return to the network device A 420, which is the device that transmitted the probe 580 to network device B.

Figure 7:
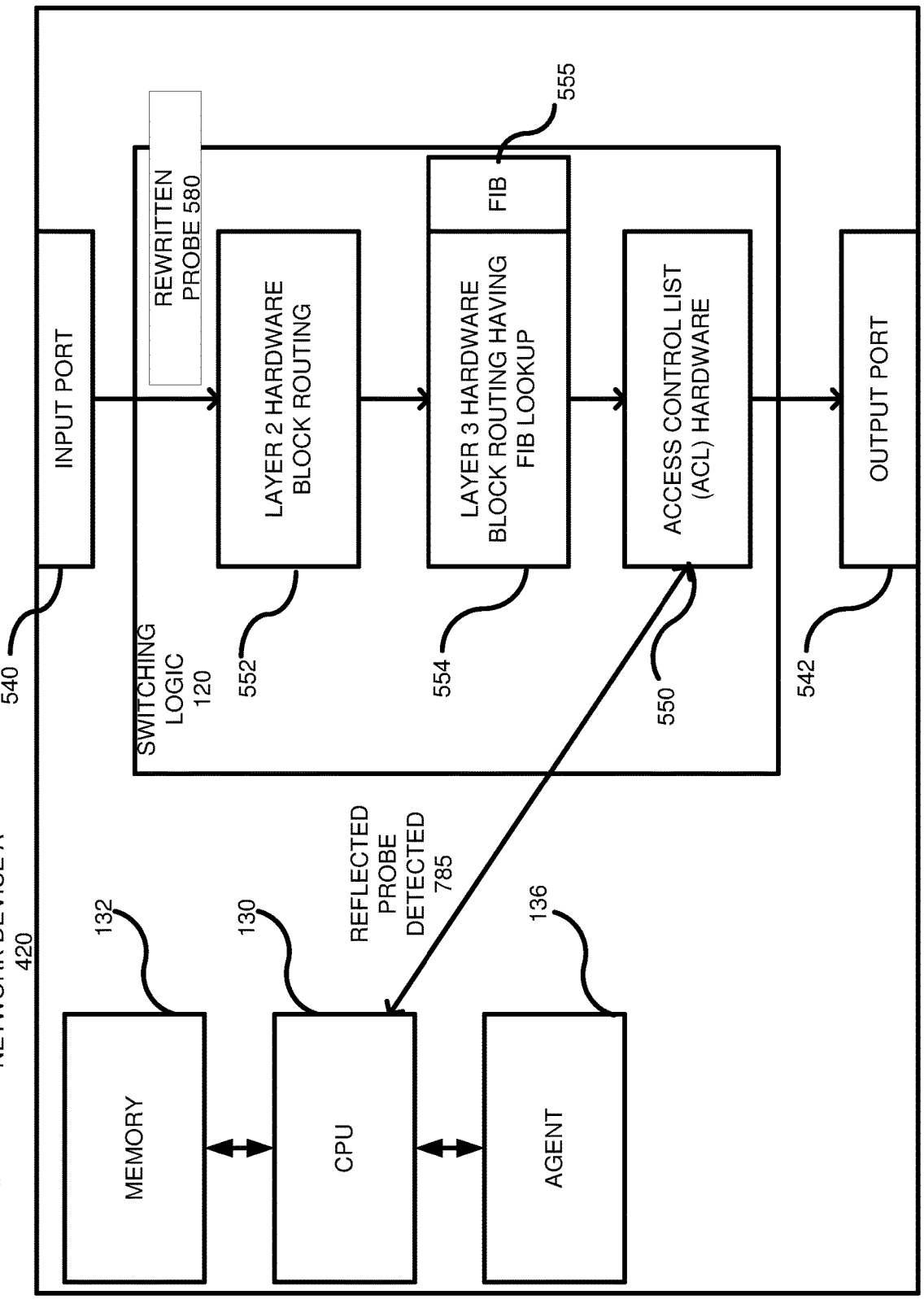
FIG. 7 shows network device A receiving back the probe of FIG. 6 for testing whether the probe was properly forwarded to network device B.

FIG. 7 shows the probe 580 being received back in network device A on the input port 540. The probe 580 again goes through layer 2 552 and layer 3 554 hardware. However, due to an incorrect MAC address, the layer 2 552 hardware controls that the layer 3 lookup does not occur. The probe 580 is then detected in the ACL hardware 550 through a signature match and transmitted to the agent 136 executing on the CPU 130. The agent 136 can check the rewritten probe 580 to ensure that the layer 2 hardware 552 and layer 3 hardware 554 performed proper lookups and rewriting of the probe. Thus, the agent 136 effectively tested the layer 2 hardware 552 and the layer 3 hardware 554. Reviewing the previous figures, FIG. 5 shows the network device A 520 transmitting a probe packet after layer 2 and layer 3 lookup. FIG. 6 shows the probe packet received on the network device B, wherein the probe is identified and sent back on the same input port as output port. Then in FIG. 7, network device A receives the probe again, detects the probe signature, overrides the layer 3 hardware lookup and instead routs the probe to the agent 136 as indicated at 785. The agent can then confirm the forwarding state within the FIB 555 as well as proper operation of the layer 2 and layer 3 lookups. Such confirmation is accomplished by comparing the layer 2 header and possibly the layer 3 header and confirming that they are what was expected. For example, the layer 2 header should have a source MAC that is equal to the MAC address for network device B 430. The layer 3 header should have the proper destination IP address and the proper source address. Additionally, testing can be accomplished by ensuring that the probe was reflected by the correct network device B. Moreover, the links between network device A 420 and network device B 430 are tested.

Figure 8:
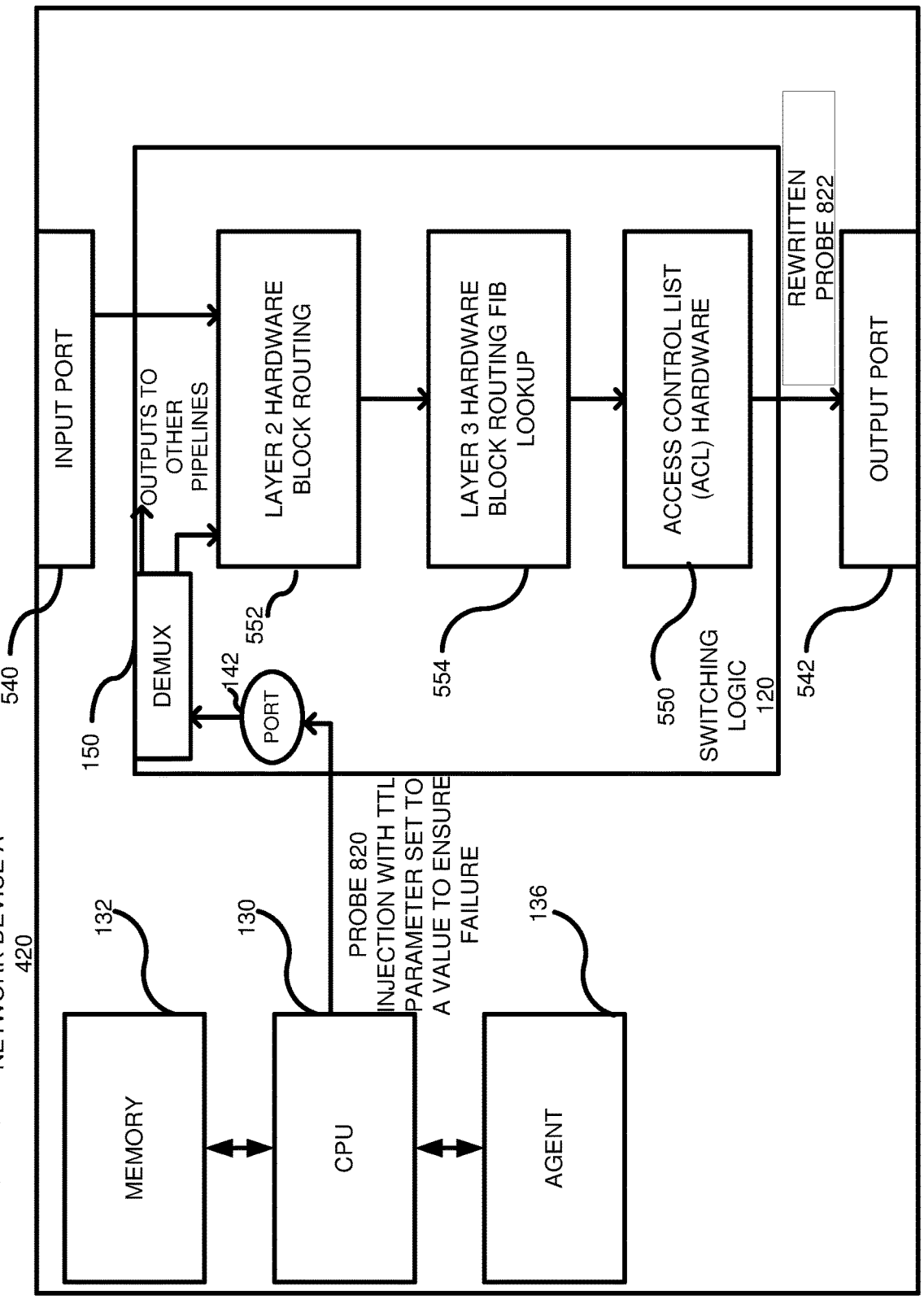
FIG. 8 shows an embodiment wherein the network device A injects a probe that includes a time-to-live (TTL) parameter for transmission to the network device B.

FIG. 8 shows the network switch A 420 according to another embodiment. In this embodiment, the agent 136 injects a probe 820 into the switching logic 120. The probe 820 is injected into the layer 2 hardware 552 with a time-to-live (TTL) parameter set to 2. The TTL parameter is a value that is part of an Internet Protocol (IP) used by a router to know whether a packet has been in the network for too long of a period of time. The TTL can decrement, for example, for each router that a packet is transmitted to and, if it reaches zero, an error condition occurs. In the event of an error, the packet is transmitted to the CPU on the router for further processing. The TTL value is set so that when the packet reaches the network switch B 430, the TTL parameter will fail. Such a purposeful failure of the TTL parameter is to alter the flow of the probe 820 through network switch B. A layer 2 lookup and a layer 3 lookup are performed so that the network device A 420 can have its forwarding states tested. During the layer 3 lookup, the TTL value is decremented to 1. The probe 820 can test the route from network device A 420 to network device B 430, the Equal-Cost-Multi-Path (ECMP) routing, the ingress and egress properties of the router, etc. In a similar manner as was described above, the probe 820 passes through the ACL 550 and is directed to the output port 542 as rewritten probe 822. Once the probe 820 is injected, the agent 136 can wait for a period of time (e.g., 1-5 seconds) for a reflected probe to be received. If no probe is returned, if the probe is returned from an unexpected network device, or if the reflected probe is incorrect for other reasons, then a forwarding rule failure can occur and can be reported to the centralized controller.

Figure 9:
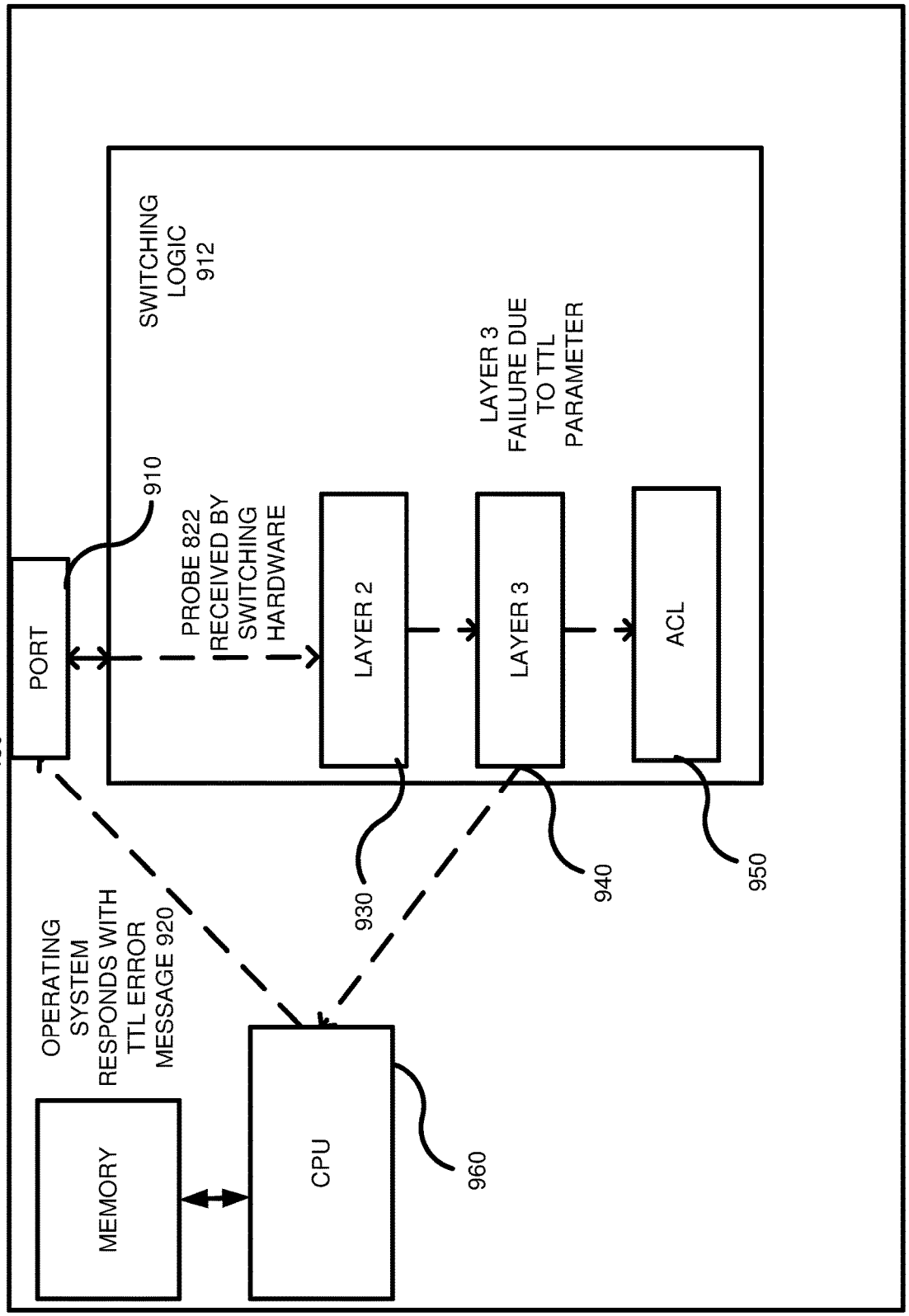
FIG. 9 shows the network device B receiving the probe of FIG. 8, and detecting it's a probe through the TTL parameter, and sending an error message on the same port upon which the probe was received.

FIG. 9 shows the probe 822 from FIG. 8 being received on a port 910. In the switching logic, the probe 822 passes through layer 2 hardware 930, and at the layer 3 hardware 940, the TTL parameter is decremented to a value that causes an error condition due to the agent 136 on network switch A 420 setting it to a value so as to cause failure. Specifically, the layer 3 hardware decrements the TTL parameter to a value of 0, which triggers an error. The layer 3 switch does not perform a lookup in the FIB and, instead, transmits the probe 822 to the CPU 960, which is running an operating system (not shown), and which handles the error condition. The operating system responds to the error condition with a message, such as an Internet Control Message Protocol (ICMP) error message 920, that is transmitted back to network device A 420 through port 910 or a different port (not shown). The ICMP error message can have the destination address as the IP address of the agent 136 on Network Device A 420. The layer 3 header is modified so that the destination IP is equal to network device A 420 IP address. One advantage of using the TTL parameter is that an agent need not be executed on the network device B 430. Instead, an operating system using a standard protocol can handle the error condition. Thus, no hardware or software changes on network device B are needed.

Figure 10:
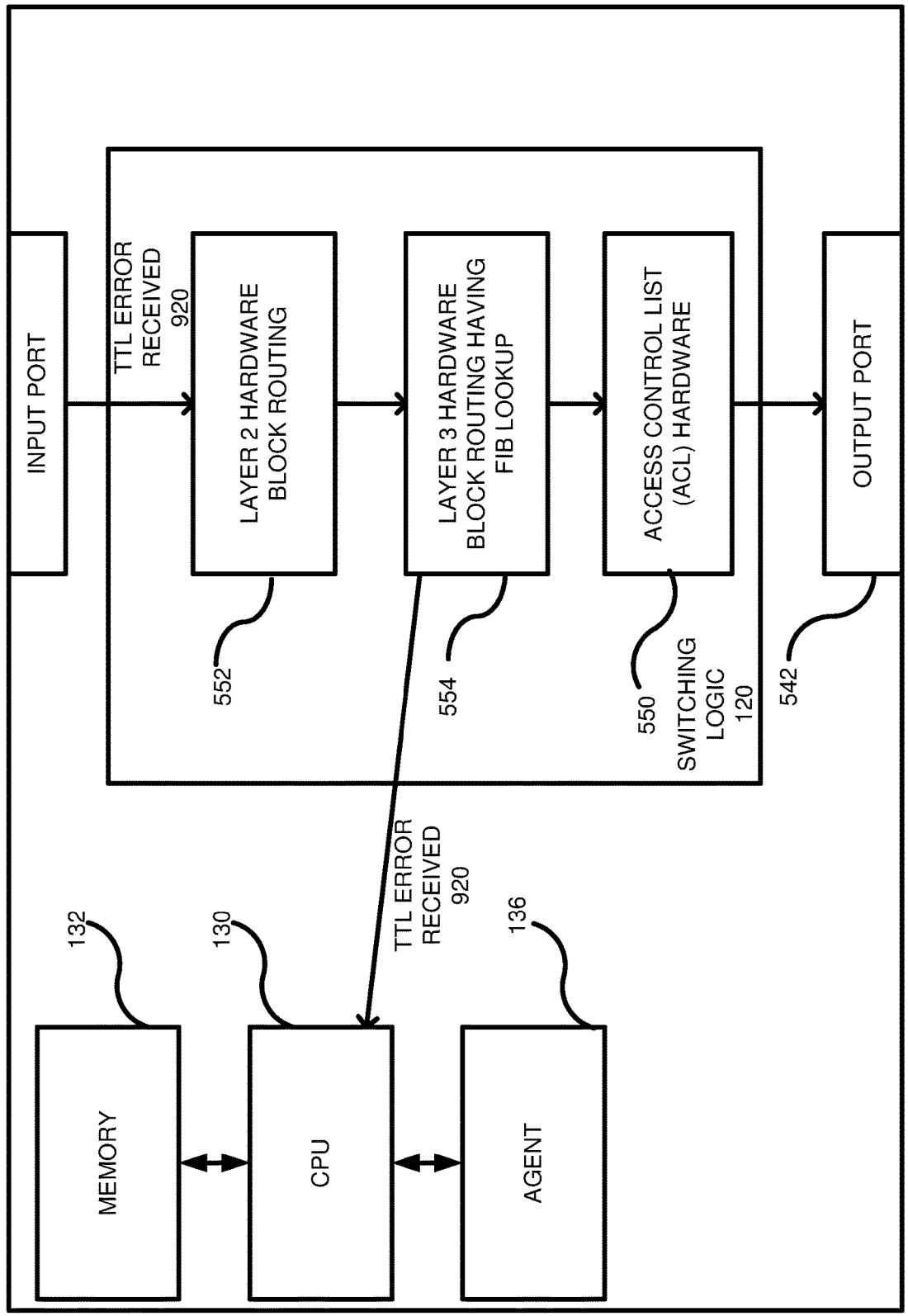
FIG. 10 shows the network device A receiving the error message of FIG. 9 and using the error message to check the forwarding states of the network devices.

FIG. 10 shows the network device A 420 receiving the ICMP error condition back from the network device B 430 (FIG. 9) as indicated by packet 920 having the TTL error condition. The layer 3 hardware 554 detects the ICMP packet and transmits the packet 920 to the agent (which is the destination IP address) for analysis by the agent 136. The agent 136 determines that the probe 822 successfully went through layer 2, layer 3 and the ACL of the network switch A 420. The switching logic 120 properly switched the probe 822, since it was received from network device B 430. Thus, a check can be made that the source MAC address is the network device B 430, confirming that the packet was correctly routed by network device A to network device B. Such a confirmation indicates that the forwarding states of network device A are correct. Additionally, the TTL error condition was properly detected and handled. Thus, FIGS. 8-10 show how probes can be used to test forwarding states of a network switch by setting a TTL parameter for failing on a neighbor switch. Such a failure causes the peer network device to transmit an error to the source device, which can use the error as a signal that the forwarding state are correctly operating. Like the previous embodiment, the network device A 420 successfully tested its layer 2 and layer 3 forwarding states, as well as the links between network device A and network device B.

Figure 11:
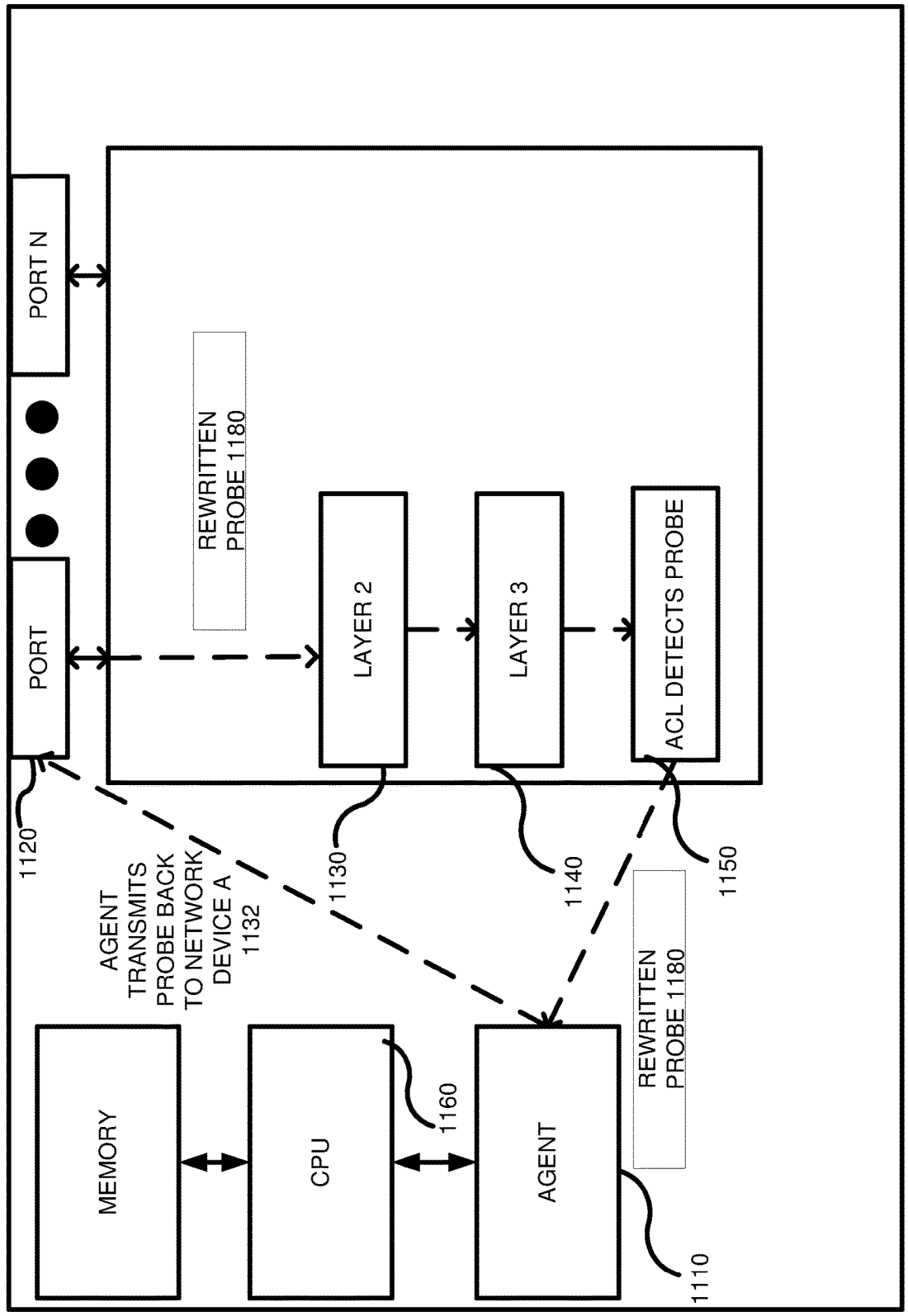
FIG. 11 shows an embodiment wherein a network device B receives a probe, detects the probe using Access Control List (ACL) hardware, and transmits the probe back to the network device A on a same port upon which the probe was received.

FIG. 11 shows another embodiment wherein a network device B 430 receives a probe, such as rewritten probe 1180. The rewritten probe 1180 can pass through layer 2 hardware 1130 and layer 3 hardware 1140. However, the rewritten probe 1180 can include a signature that is matched against the ACL hardware 1150. Thus, the layer 2 and layer 3 lookups are ignored in favor of the ACL that matches on a signature. In one example, the ACL can use a User Datagram Protocol (UDP) header for matching against a stored value in the ACL hardware. When the ACL detects the probe 1180, it transmits the probe 1180 to an agent 1110, which is executing on a CPU 1160. The agent 1110 can recognize the probe 1180 and transmit the probe back to network device A 420 as indicated at 1132 using the IP address of the agent on network device A 420. The transmission can occur on port 1120, which can be a same port that the rewritten probe 1180 was received on or a different port. The reflected probe can then be detected by network device A 420 using ACL hardware as already discussed. Thus, in this embodiment, an agent is executing on the source device and the peer device and specialized ACL hardware circuits are used to match signatures within the probe for probe identification.

Figure 12:
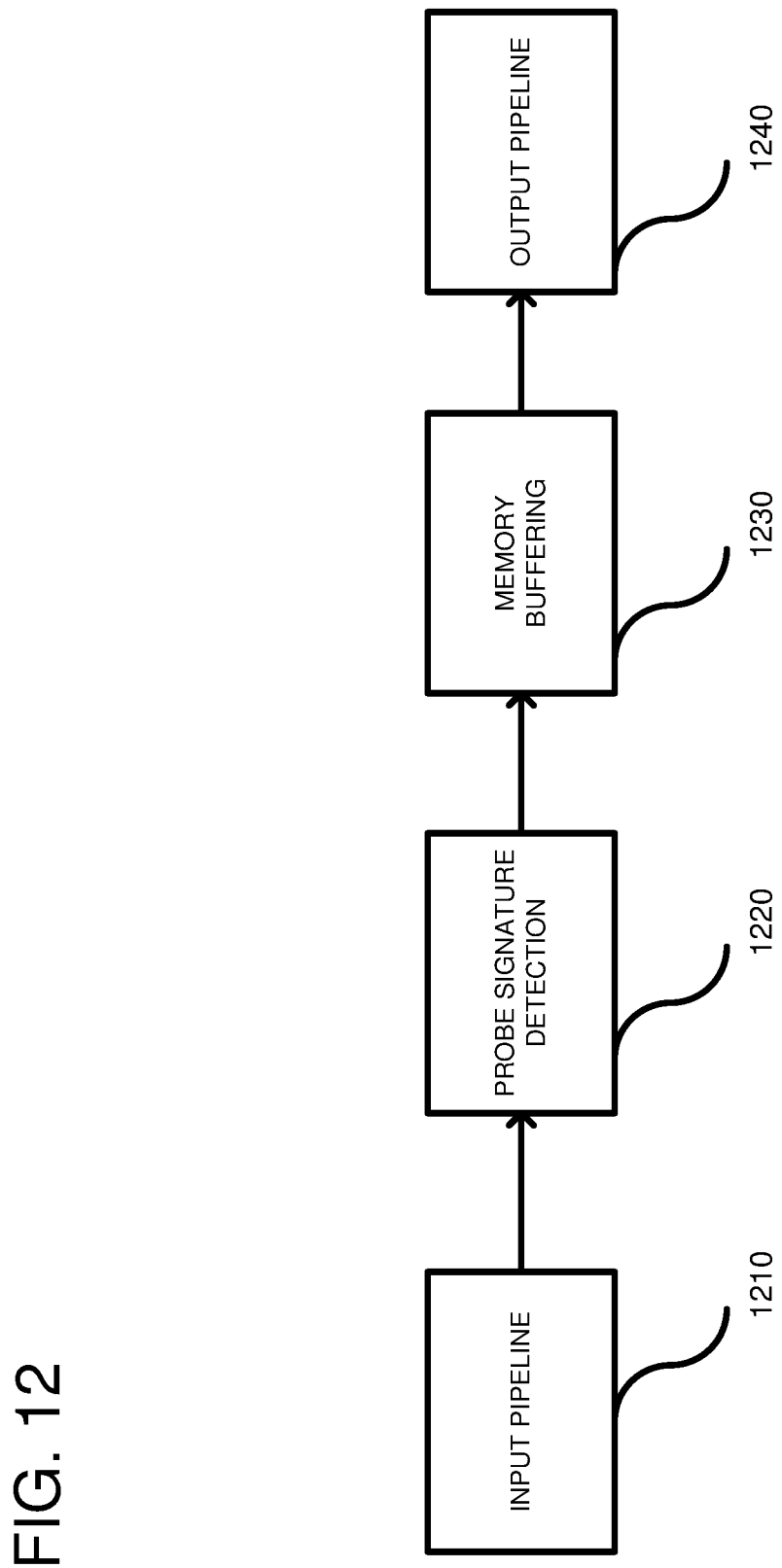
FIG. 12 provides additional details showing a data plane of a network switch with different logical blocks that a packet traverses with probe signature detection for identifying that a packet is a probe.

FIG. 12 shows further details of the switching logic, such as switching logic 120 of FIG. 5. The switching logic includes an input pipeline 1210, which can comprise layer 2 hardware and layer 3 hardware. The switching logic 120 can further include probe signature detection hardware 1220, which can be positioned within ACL hardware or after the ACL hardware but prior to memory buffering 1230. The probe signature detection can analyze a combination of bits within a packet and can generate a trigger if the bits match a predetermined combination inserted from the agent, such as agent 136 in FIG. 5. In one example, bits within a packet's UDP header are used for determining a matching signature. If there is a match, then the ACL considers the packet a probe and can route the packet back to the agent 136. Alternatively, the packet is switched to an output port indicated by the layer 3 lookup, as the probe is considered normal user traffic. Thus, the memory buffering 1230 is used to queue output packets for delivery on an output pipeline 1240, which in various embodiments is part of the switching logic 120 or part of an output port that is coupled to the switching logic 120. Generally, the memory buffering 1230 and the output pipeline 1240 are additional components after the ACL. Thus, for example, in FIG. 5, the input pipeline 1210 is the layer 2 hardware 552 and the layer 3 hardware 554. The probe signature detection 1220 is the ACL 550, and the memory buffering 1230 and output pipeline 1240 are inserted after the ACL. Packets are fed from the memory buffer 1130 to the output pipeline 1140 and are transmitted to a neighbor network device.

Figure 13:
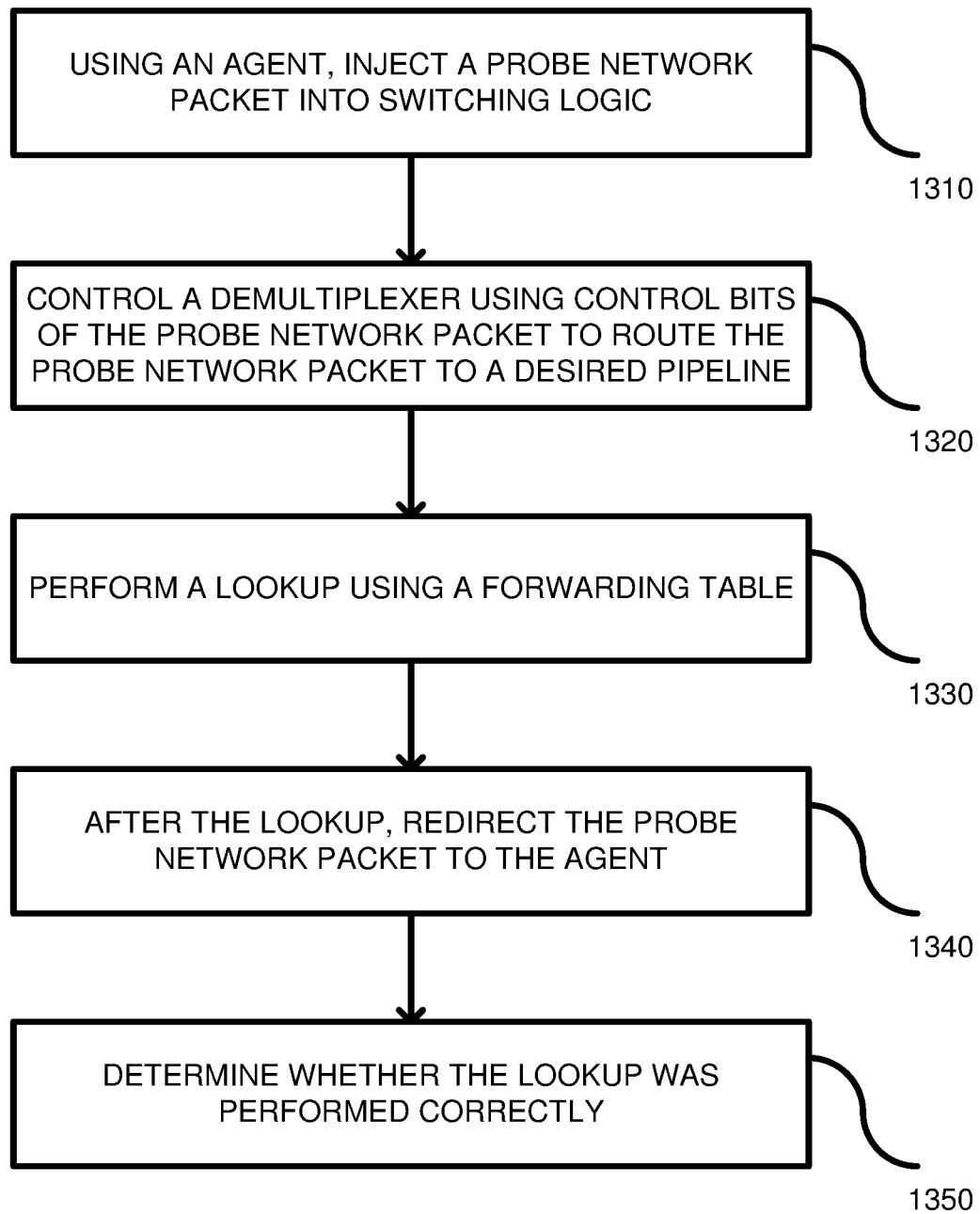
FIG. 13 is a flowchart according to one embodiment for testing forwarding states in a network device.

FIG. 13 is a flowchart according to an embodiment for testing forwarding tables in multiple pipelines. In process block 1310, an agent is used to inject a probe network packet into switching logic. For example, as shown in FIG. 1, the agent 136 can inject the probe network packet to the CPU port 142. In process block 1320, a demultiplexer is controlled using control bits of the probe network packet to route the probe network packet to the desired pipeline. For example, as shown in FIG. 1, the output of the demultiplexer 150 is coupled to multiple pipelines (0-N) and based on the control bits of the probe network packet, the probe network packet is routed to one of the pipelines 160. In process block 1330, a lookup for the probe network packet is performed using the forwarding table. For example, the probe network packet can pass through the switching logic 120 (see FIGS. 3, 5, and 8). The probe network packet includes an IP address as selected by the agent to test a particular entry in the FIB of the selected pipeline. In process block 1340, after the lookup, the probe network packet is redirected to the agent. The probe network packet is typically modified after the lookup so as to change the header information for switching purposes. For example, the header can include port information to direct the probe network packet to the appropriate output port so that the packet is transmitted to a next hop in accordance with the FIB. Redirecting to the agent can include a single-hop approach as shown in FIG. 3 or can include a multi-hop approach as described in FIG. 4 and further illustrated in FIGS. 5-11. In any case, in process block 1350, the agent retrieves the probe network packet in a modified form and can determine whether the packet had a correct lookup by either examining how the packet was modified or from which other device the packet was received. After the agent verifies the FIB entry by examining the redirected packet, the agent can reinject the packet again with different control bits to select another pipeline. Each pipeline includes a copy of the FIB, but a FIB entry in any of the pipelines can be defective. The agent can continue to check and verify each FIB in each pipeline until the entire network device is tested.

Figure 14:
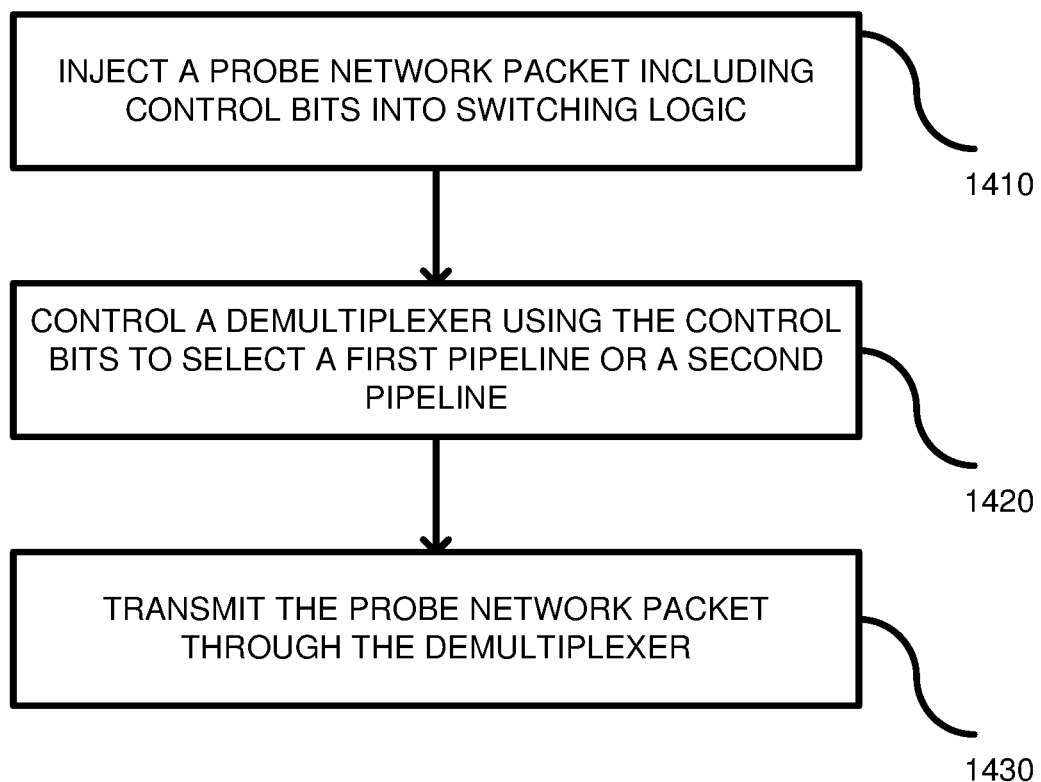
FIG. 14 is a flowchart according to another embodiment for testing forwarding states in a network device.

FIG. 14 is a flowchart according to another embodiment for testing pipelines in switching logic. In process block 1410, a probe network packet is injected into switching logic, wherein the probe network packet includes control bits for selecting its path through the demultiplexer. As shown in FIG. 2, the control bits can be in the header portion 210 of the probe network packet, or it can be in another desired location. In process block 1420, the probe network packet's control bits are used to select a path through the demultiplexer to select one of a first pipeline or a second pipeline. For example, in FIG. 1, any of the pipelines 160 can be coupled through the demultiplexer to the CPU port. In process block 1430, the probe network packet is transmitted through the demultiplexer to an output selected by the control bits. Thus, the probe network packet is able to test either of the first or second of the pipelines in the IC so as to test all of the FIB s in the switching logic. Additional pipelines can be added.

Figure 15:
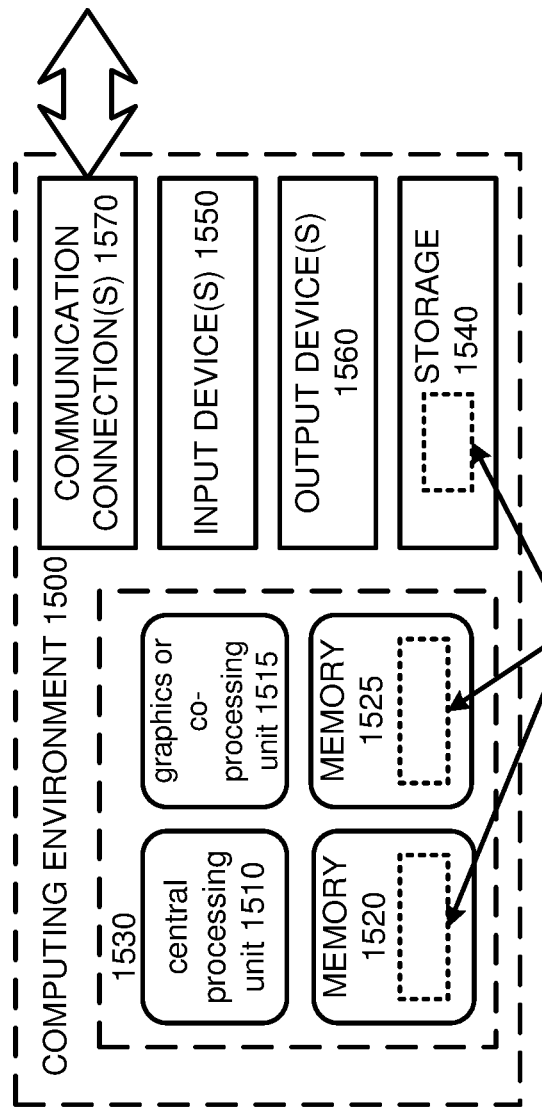
FIG. 15 depicts a generalized example of a suitable computing environment in which the described innovations may be implemented.

FIG. 15 depicts a generalized example of a suitable computing environment 1500 in which the described innovations may be implemented. The computing environment 1500 is not intended to suggest any limitation as to scope of use or functionality, as the innovations may be implemented in diverse general-purpose or special-purpose computing systems. For example, the computing environment 1500 can be any of a variety of computing devices (e.g., desktop computer, laptop computer, server computer, tablet computer, etc.). Portions of the computing environment can be used in the network device 100, for example.

With reference to FIG. 15, the computing environment 1500 includes one or more processing units 1510, 1515 and memory 1520, 1525. In FIG. 15, this basic configuration 1530 is included within a dashed line. The processing units 1510, 1515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 15 shows a central processing unit 1510 as well as a graphics processing unit or co-processing unit 1515. The tangible memory 1520, 1525 may be volatile memory (e.g., registers, cache, RAM), non-volatile memory (e.g., ROM, EEPROM, flash memory, etc.), or some combination of the two, accessible by the processing unit(s). The memory 1520, 1525 stores software 1580 implementing one or more innovations described herein, in the form of computer-executable instructions suitable for execution by the processing unit(s). In one embodiment, aspects of the computing environment 1500 can be used in the network devices described herein.

A computing system may have additional features. For example, the computing environment 1500 includes storage 1540, one or more input devices 1550, one or more output devices 1560, and one or more communication connections 1570. An interconnection mechanism (not shown) such as a bus, controller, or network interconnects the components of the computing environment 1500. Typically, operating system software (not shown) provides an operating environment for other software executing in the computing environment 1500, and coordinates activities of the components of the computing environment 1500.

The tangible storage 1540 may be removable or non-removable, and includes magnetic disks, magnetic tapes or cassettes, CD-ROMs, DVDs, or any other medium which can be used to store information in a non-transitory way and which can be accessed within the computing environment 1500. The storage 1540 stores instructions for the software 1580 implementing one or more innovations described herein.

The input device(s) 1550 may be a touch input device such as a keyboard, mouse, pen, or trackball, a voice input device, a scanning device, or another device that provides input to the computing environment 1500. The output device(s) 1560 may be a display, printer, speaker, CD-writer, or another device that provides output from the computing environment 1500.

The communication connection(s) 1570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of testing forwarding tables in a source network switch, the method comprising:
    using an agent in the source network device, injecting a probe network packet into switching logic of the network switch, wherein the switching logic includes multiple pipelines for handling network packets, wherein the probe network packet includes control bits identifying one of the multiple pipelines;
    controlling a demultiplexer within the switching logic using the control bits of the probe network packet to route the probe network packet to a desired pipeline of the multiple pipelines wherein the desired pipeline includes a forwarding table and the demultiplexer is positioned before the forwarding table;
    performing a lookup on the probe network packet using the forwarding table within the identified pipeline so as to test the forwarding table within the desired pipeline;
    after the lookup, redirecting the probe network packet to the agent on the source network device; and
    determining by the agent whether the lookup was correctly performed.

2. The method of claim 1, further including:
    transmitting the probe network packet from the source network device to a neighbor network device based on the lookup;
    receiving the probe network packet on the neighbor network device; and
    wherein the redirecting includes transmitting the probe network packet from the neighbor network device to the source network device for the determining by the agent whether the lookup was correctly performed.

3. The method of claim 2, further including:
    receiving the probe network packet on a port within the neighbor network device;
    detecting, using hardware within the neighbor network device, that the probe network packet was received; and
    transmitting the probe network packet back to the source network device on the port in which the probe network packet was received.

4. The method of claim 1, wherein the redirecting includes matching a signature of the probe network packet in an Access Control List (ACL) of the switching logic, ignoring the FIB lookup and routing the probe network packet back to the agent without transmission to a neighbor network device.

5. The method of claim 1, further including testing each of the multiple pipelines by changing the control bits in the probe network packet and reinjecting the probe network packet into the switching logic.

6. A method, comprising:
    injecting a probe network packet including control bits into switching logic in a network device;
    controlling a demultiplexer using the control bits to select a first pipeline or a second pipeline within the switching logic, the first pipeline having a first Forwarding Information Base (FIB) and the second pipeline having a second FIB, wherein the demultiplexer is positioned before the first and second FIB; and
    transmitting the probe network packet through the demultiplexer to the selected pipeline to test the FIB within the selected pipeline.

7. The method of claim 6, wherein the control bits are within a header of the probe network packet.

8. The method of claim 6, wherein each of the first and second pipelines is coupled to multiple output ports of the network switch.

9. The method of claim 6, wherein the switching logic includes an input port coupled to a processor within the network switch, the input port also being coupled to the demultiplexer.

10. The method of claim 6, further including:
redirecting the probe network packet to an agent on the network switch; and
determining, by the agent, whether a lookup of the FIB of the selected pipeline was correctly performed.

11. The method of claim 10, wherein the probe network packet is injected by the agent executing on a processor within the network switch.

12. The method of claim 10, wherein the probe network packet includes a time-to-live (TTL) parameter selected so that the TTL parameter expires when the probe network packet is received by a neighbor network device; and
wherein the redirecting includes transmitting the probe network packet from the neighbor network device to the agent at the network switch when the TTL parameter expires.

13. The method of claim 6, further including testing the FIB of the selected pipeline by performing a lookup in the FIB of the selected pipeline using an address within the probe network packet.

14. The method of claim 6, wherein the control bits are used as inputs to select input lines of the demultiplexer so as to control which output of the demultiplexer the probe network packet is passed.

15. An Integrated Circuit (IC), comprising:
a processor port for receiving a probe network packet from a processor;
a demultiplexer having an input port coupled to the processor port and having first and second output ports, the demultiplexer having select lines arranged so that a packet received on the processor port controls which output port of the demultiplexer is coupled to the input port; and
a first packet pipeline coupled to a first output port of the demultiplexer and a second packet pipeline coupled to the second output port of the demultiplexer, wherein the first packet pipeline includes a first Forwarding Information Base (FIB) positioned after the demultiplexer and the second packet pipeline includes a second FIB positioned after the demultiplexer.

16. The IC of claim 15, wherein each packet pipeline comprises:
layer 2 circuitry for checking Media Access Control (MAC) addresses on incoming packets; and
layer 3 circuitry for performing a lookup on the incoming packets using the first or second FIB.

17. The IC of claim 15, further including:
probe detection circuitry for determining whether a particular packet is a probe packet, and for transmitting the probe packet to the processor for analysis after the probe network packet has passed through one of the pipelines.

18. The IC of claim 17, wherein the probe detection circuitry includes an Access Control List (ACL) circuit that compares a User Datagram Protocol Header (UDP) within the probe network packet against a stored UDP header.

19. The IC of claim 15, wherein the IC is within a network device used for switching packets.

* * * * *